United States Patent [19]
Gluck et al.

[11] Patent Number: 4,572,865
[45] Date of Patent: Feb. 25, 1986

[54] FACED FOAM INSULATION BOARD AND FROTH-FOAMING METHOD FOR MAKING SAME

[75] Inventors: David G. Gluck, St. Petersburg; Alberto DeLeon, Clearwater; John P. Oliver, St. Petersburg, all of Fla.

[73] Assignee: The Celotex Corporation, Tampa, Fla.

[21] Appl. No.: 558,136

[22] Filed: Dec. 5, 1983

[51] Int. Cl.[4] .......................... B32B 5/20; C08J 9/30; B29C 67/22; B29C 39/18

[52] U.S. Cl. .............................. 428/309.9; 264/45.3; 264/46.2; 264/46.3; 264/50; 264/53; 264/258; 264/DIG. 5; 425/115; 425/817 C; 428/314.4; 428/317.9; 428/319.1

[58] Field of Search ................... 264/46.2, 46.3, 45.3, 264/50, 53, DIG. 5, 258; 425/115, 817 C; 428/309.9, 314.4, 317.9, 319.1

[56] References Cited

U.S. PATENT DOCUMENTS

| | | | |
|---|---|---|---|
| Re. 30,984 | 6/1982 | Hipchen et al. | 428/297 |
| 2,814,205 | 7/1958 | Bird | 264/46.2 |
| 3,050,427 | 8/1962 | Slayter et al. | 156/26 |
| 3,184,419 | 5/1965 | Merriman | |
| 3,251,092 | 5/1966 | Printz | 264/50 X |
| 3,382,302 | 5/1968 | Marzocchi | 264/45 |
| 3,580,763 | 5/1971 | Criner et al. | 156/78 |
| 3,627,275 | 12/1971 | Gusmer | 259/4 |
| 3,745,203 | 7/1973 | Harper | 264/48 |
| 3,764,428 | 10/1973 | Oshima et al. | 156/78 |
| 3,769,115 | 10/1973 | Rasmussen et al. | 156/62.2 |
| 3,838,074 | 9/1974 | Hoshino et al. | |
| 3,846,524 | 11/1974 | Elmore et al. | 264/45.3 |
| 3,874,980 | 4/1975 | Richards et al. | |
| 3,900,650 | 8/1975 | Sedore | 428/86 |
| 3,926,700 | 12/1975 | Hopkins, Jr. et al. | 264/50 X |
| 3,940,517 | 2/1976 | DeLeon | 427/373 |
| 3,954,544 | 5/1976 | Hooker | 156/356 |
| 3,956,438 | 5/1976 | Schippers | 264/46.1 |
| 3,970,732 | 7/1976 | Slaats et al. | 264/40.5 |
| 3,977,931 | 8/1976 | Peille | 156/78 |
| 4,023,526 | 5/1977 | Ashmus et al. | 118/410 |
| 4,025,372 | 5/1977 | Fenton | 264/46.8 X |
| 4,028,158 | 6/1977 | Hipchen et al. | 156/79 |
| 4,073,997 | 2/1978 | Richards et al. | 428/285 |
| 4,089,296 | 5/1978 | Barchi | 118/413 |
| 4,091,142 | 5/1978 | Elmore et al. | 428/322 |
| 4,098,855 | 7/1978 | Fries | 264/50 |
| 4,118,533 | 10/1978 | Hipchen et al. | 428/297 |
| 4,121,957 | 10/1978 | Allen | 156/79 |
| 4,174,415 | 11/1979 | Bethe | 428/90 |
| 4,179,540 | 12/1979 | Smarook | 428/71 |
| 4,188,355 | 2/1980 | Graham et al. | 264/26 |
| 4,204,019 | 5/1980 | Parker | 428/310 |
| 4,231,825 | 11/1980 | Carter | 156/78 |
| 4,242,409 | 12/1980 | Parker | 428/297 |
| 4,246,356 | 1/1981 | Walmsley | 521/50 |
| 4,279,958 | 7/1981 | Ahmad | 428/215 |
| 4,303,456 | 12/1981 | Schmuck et al. | 156/78 |
| 4,314,963 | 2/1982 | Boden et al. | 264/328.6 |
| 4,372,900 | 2/1983 | Doerfling | 264/45.3 |
| 4,388,366 | 6/1983 | Rosato et al. | 428/285 |
| 4,414,265 | 11/1983 | Rosato et al. | 428/285 |
| 4,496,625 | 1/1985 | Snider et al. | 428/319.1 X |

OTHER PUBLICATIONS

Knox, R. E., "Frothing Processes for Urethane Foams," Foam Bulletin of Du Pont Elastomers Laboratory, Dupont Hylene, Jun. 22, 1960, 8 pages.
White Line Product Bulletin, Apache Building Products Company, 1980, 12 pages.

Primary Examiner—Philip Anderson
Attorney, Agent, or Firm—James W. Grace; Charles W. Vanecek

[57] ABSTRACT

A method for continuously producing an insulation board comprising a rigid plastic foam core having two major surfaces and a facing material on one or both of the major surfaces, the method including conveying a facing material along a production line, depositing a partially expanded froth foam of a plastic mixture, which contains at least one frothing agent, on the facing material, and further expanding and curing the froth foam in contact wiht the facing material to form the insulation board. The board is particularly useful as roof insulation.

54 Claims, 6 Drawing Figures

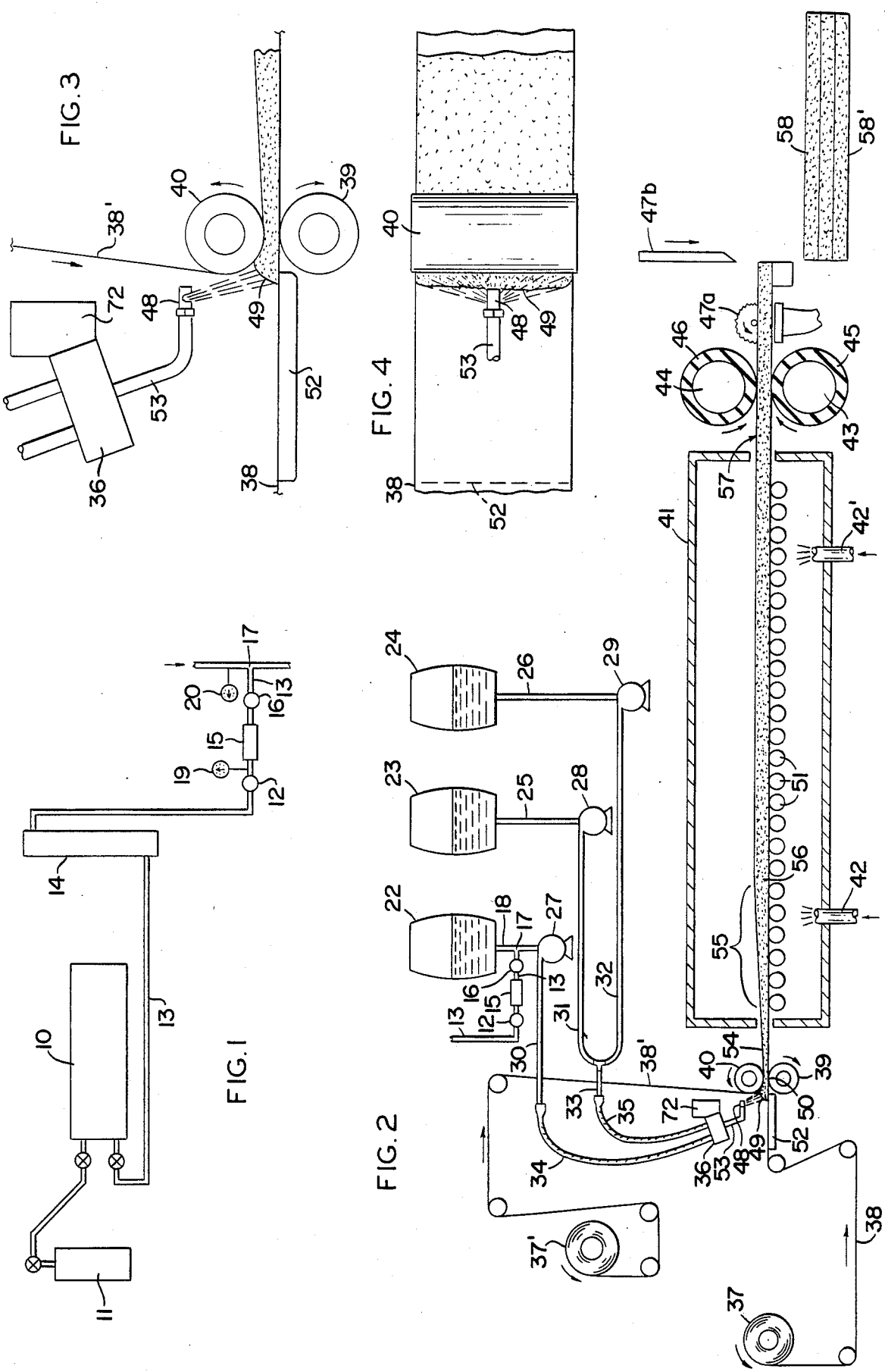

FACED FOAM INSULATION BOARD AND FROTH-FOAMING METHOD FOR MAKING SAME

FIELD OF THE INVENTION

This invention relates to a method for continuously producing a rigid plastic foam insulation board with a facing member on at least one major surface thereof, and more particularly to a froth-foaming method for continuously producing an organic foam core faced on one or both sides with organic or inorganic fibers, preferably glass fibers. It also relates to the product formed by such a method.

DESCRIPTION OF THE PRIOR ART

Rigid foam products have been reinforced in various ways to give them added strength or other desirable physical properties which the foam itself is incapable of providing. These foam products have become increasingly useful in the building industry since they possess many properties which make them extremely valuable in this field. They have high structural strength coupled with relatively low density. Furthermore, the rigid foam products are excellent thermal insulators because of their fine closed cell structure. Many different techniques have been developed for manufacturing the foam products, such as those described in U.S. Pat. Nos. 3,846,524, 3,874,980, 4,091,142, 3,900,650 and 4,028,158.

The last mentioned of the above patents, i.e., U.S. Pat. No. 4,028,158, discloses a procedure for the continuous production of glass fiber reinforced plastic foam which is sandwiched between and adhered to facing sheets. In accordance with this method, a liquid foam forming mixture is deposited on a glass fiber mat which is conveyed along the production line on top of a moving facing sheet, which can be an asphalt-saturated roofing felt. Another felt facing sheet is applied over the foam forming mixture and the composite is formed into an insulation board which is particularly suitable for use in built-up roofing. Aside from its function as protective covering, the asphalt-saturated felt facer prevents penetration and loss of chemicals therethrough during production and accordingly avoids the expense of wasted foamable ingredients.

An alternative approach is to produce a roof insulation product having facers of glass fibers instead of impenetrable asphalt-saturated felts, such as in U.S. Pat. No. 3,874,980. One difficulty with this approach is that bleeding of the liquid foamable material through the glass fibers can bring about material loss and contamination of equipment, and generally impair commercial production. This is unfortunate because a suitably produced glass faced plastic foam can provide a strong, lightweight and dimensionally stable insulation board which is particularly useful in roof insulation. It would be highly desirable if a simple and efficient foam manufacturing method could be found which produces an insulation board faced with glass fiber without undesirable wetting through the glass fibers by the foam chemicals.

OBJECTS OF THE INVENTION

It is therefore an object of the present invention to provide an improved method for the continuous production of a rigid foam plastic faced with organic or inorganic fibers in a simple and economical manner, and without significant loss of foamable chemicals by wetting through the fibrous material.

It is another object of the present invention to produce a laminate in a continuous manner by depositing a partially expanded froth foam on a fibrous mat, contacting the upper surface of the deposited froth foam with another fibrous mat to form sandwich of the upper and lower mats with the froth foam therebetween, facing sheets optionally being provided above and below the upper and lower mats, respectively, and thereafter completely foaming the froth foam.

It is a further object of the present invention to produce an improved insulation board in a continuous manner by depositing partially expanded froth foam on an advancing facing material, optionally placing a second advancing facing material on the deposited froth foam, and fully expanding and curing the froth foam in contact with the facing material(s) to form the insulation board.

It is a still further object of the present invention to produce an insulation board comprising a rigid foam plastic core which is faced with organic or inorganic fibers and is strong, lightweight and dimensionally stable.

It is yet another object of the present invention to produce an insulation board comprising a rigid foam plastic core which is faced with organic or inorganic fibers and is very resistant to delamination.

It is an additional object of the present invention to produce an insulation board having a high insulation value and superior fire resistant properties, which would qualify for model building code approvals and approval by the Factory Mutual Research Corporation, an independent risk certification firm.

It is still another object of the present invention to provide a glass faced rigid foam plastic insulation board which is especially tough and impact-resistant major surfaces, and exhibits overall good properties, including low friability, and good dimensional stability and thermal resistance, and can be used in the building industry, particularly as roof insulation with superior fire resistant properties, such as an FM Class I rating for insulated steel deck roofs.

These and other objects and advantages of the present invention will become more apparent to those skilled in the art when the instant disclosure is read in conjunction with the accompanying drawings.

SUMMARY OF THE INVENTION

The above objects have been achieved in the process of the present invention for the continuous production of a reinforced foam structure, wherein a partially expanded froth of foamable chemicals is applied to a moving substrate, and the foam mixture completely expands in contact with the substrate. Another material is advantageously placed over the deposited, partially expanded froth so that the insulation board product will comprise a rigid plastic foam core with facing materials on opposite major surfaces of the core. A wide variety of materials can be employed as the facers in the process of the invention. For example, the carrier substrate or lower facer on the production line can be a rigid or flexible material, such as perlite board, gypsum board, fiberboard, a metal sheet such as steel or aluminum, asphalt-saturated felt, a fiber glass sheet, an asphalt fiber glass sheet, etc., while the covering or upper facer on the line is generally a flexible material, such as asphalt-saturated felt, an asphalt fiber glass sheet, a fiber glass sheet, a metal (e.g., aluminum foil facer), etc.

In a preferred embodiment, the lower carrier substrate is a fibrous layer(s), and another fibrous layer(s) is provided to cover the foam-forming mixture/lower fibrous layer(s) composite so as to produce a fully foamed product comprising a sandwich of plastic foam with upper and lower fibrous facers. The fibrous layer(s) can comprise organic and/or inorganic fibers, and preferably comprises inorganic fibers. Advantageously, a compressive force is applied during production to the composite of fibrous layers and froth foam to help bring about penetration of the froth foam into the fibrous layers. In a further embodiment of the invention, facing sheets such as aluminum foil facers can be provided above and below the upper and lower fibrous layers, respectively.

The core of the faced product comprises a rigid foam formed from a foam-forming mixture. The foam-forming mixture may be comprised of any of the commercially available foamable compositions which have the capacity of being froth foamed onto a moving substrate, and, where the substrate is a fibrous layer(s), penetrating into the layer(s), and thereafter of further expanding at a reasonably rapid rate to produce a rigid foam of predetermined thickness. Foams according to the present invention may be polyurethanes, polyisocyanurates, phenolic polymers, polyesters, epoxides or other types of foam. By way of example, the thickness of the fully expanded foam core can vary from about ¼ inch to 6 inches, depending upon the degree of insulation desired, and the core can have a density from about 1 to 3 lb/ft$^3$.

Catalysts, fillers, surfactants, flame retardants, dyes and other special additives may be added to the foamable composition, as is well-known in the art, in order to effect certain properties. Surfactants, such as polyoxyethylene-sorbitan monopalmitates, polyoxyethylene sorbitan polydimethyl siloxane and polydimethyl siloxane polyoxyalkylene block copolymers, can serve as wetting agents in adhering fibers to foam and can effect the foam cell size by lowering surface tension.

Through the frothed foam process of the invention, it is possible to continuously produce a plastic foam board which has on at least one of its major surfaces an adherent layer or layers of organic and/or inorganic fibers without appreciable loss of foamable chemicals through the fibrous layer(s) during foam formation. Fibers suitable for use in this invention include natural organic fibers such as cotton and cotton waste; fibers such as regenerated cellulose staple fiber and cellulose acetate fiber; synthetic fibers such as polyester fibers, polyamide fibers, polyvinyl acetal fibers, and polypropylene fibers; and inorganic fibers such as glass fibers, glass wool, mineral wool, rock wool and slag wool. Combinations of the above fibers, such as a mixture of glass fiber and mineral wool, or glass fiber and glass wool, also can be used. The fibrous layer(s) used in the present invention must be such that a polymeric foam which is frothed in place on the layer(s) can be readily introduced among the fibers thereof without penetrating or wetting entirely through the layer(s) and thereby contaminating the workplace. An especially satisfactory fiber glass facer mat comprises chopped glass fibers oriented in a random pattern and bonded together with a suitable binder.

The frothed chemical mixture can be deposited on a lower fibrous layer(s) from a mixing head which traverses either partially or completely across the width of the layer(s). The froth also can be laid down by a stationary mixing head. The froth is produced by pressure controlled release of a volatile foaming agent composition which advantageously comprises a low boiling frothing agent and a higher boiling blowing agent. After deposition of the frothed mixture and optional application of the upper fibrous layer(s), the resultant composite advances into an expansion zone wherein the foam-forming mixture further expands to the cured state. The expansion can be the "free rise" type, such as disclosed in U.S. Pat. No. 4,028,158, where the thickness of the composite is controlled by a gap which is preferably provided by the nip of two rotating rolls. The nip of the two rotating rolls serves as a means for metering the amount of frothed mixture and assisting it in penetrating the interstices of the fibrous layer(s). Other nip-defining means, as, e.g., the combination of a doctor blade and a fixed plate, also can be employed. The expansion also can be restrained, such as where the foamable material and facer(s) are directed between a pair of spaced conveyor belts which preferably are positioned apart a distance less than the thickness the combination of foam and fibers would otherwise ordinarily reach if allowed to foam unrestrictedly. In the expansion zone, the foamable mixture/facer(s) composite can be subjected to the influence of heat controllably added by the circulation of hot air and cured to a rigid foam structure. In this manner, the resulting faced foam body or slab has two major, relatively flat, parallel surfaces in its final foam. The rigid product is then periodically severed into finite lengths, thereby forming discrete panels.

DESCRIPTION OF THE DRAWINGS

The invention will now be described with reference to the accompanying drawings in which:

FIG. 1 is a schematic of an apparatus suitable for delivering the frothing agent in the process of the present invention;

FIG. 2 is a schematic elevation of an apparatus suitable for practicing the process of the invention in a free-rise mode;

FIG. 3 is an enlarged, schematic side view of a nozzle positioned upstream of the metering rolls of the apparatus of FIG. 2 for depositing a froth in the process;

FIG. 4 is an enlarged top view of the nozzle of FIG. 3 depositing froth on an underlying glass fiber mat;

DETAILED DESCRIPTION OF THE INVENTION

Figure 5:
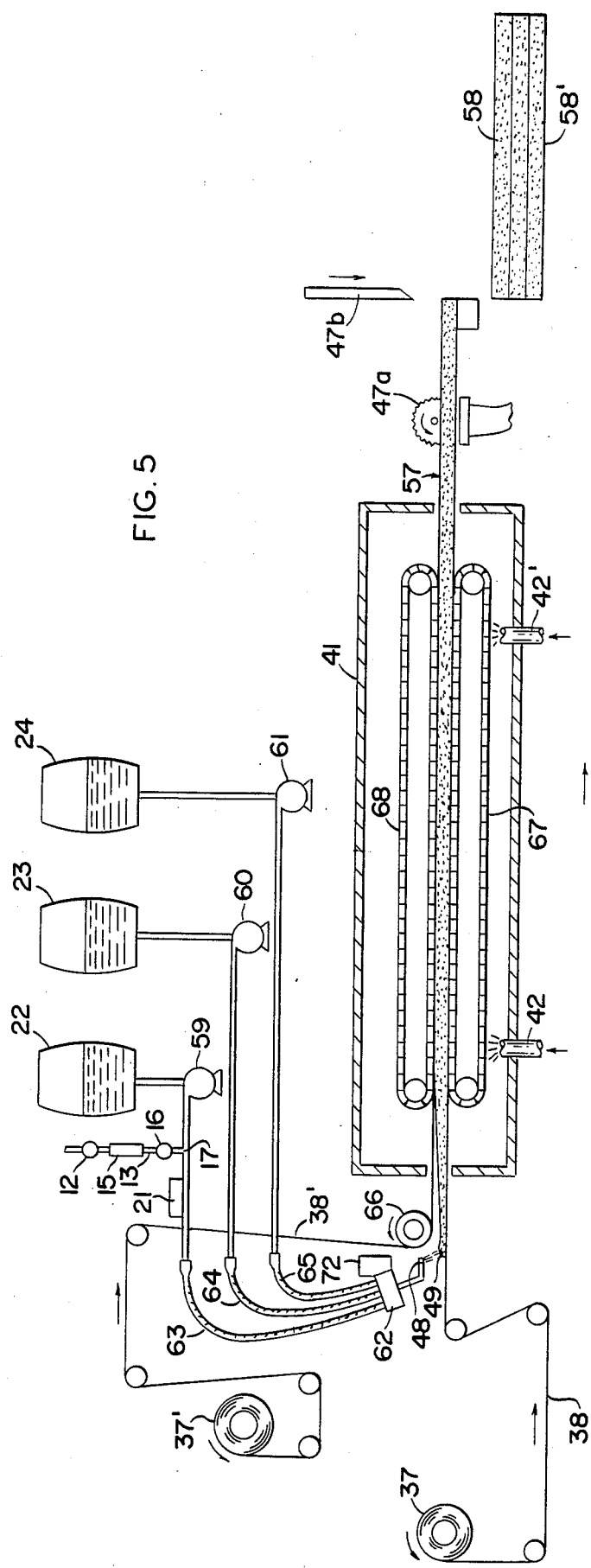
FIG. 5 is a schematic elevation of an apparatus suitable for practicing the process of the invention in a restrained-rise mode.

Referring to FIG. 1, there is shown schematically an apparatus suitable for supplying the frothing agent in the process of the present invention. The frothing agent is contained in the relatively high-pressure storage tank 10, which is capable of withstanding pressures of 250 p.s.i. or more. The agent is covered by nitrogen or other inert gas, which is supplied from a cylinder 11 under low positive pressure. The frothing agent is a low-boiling liquid that is inert to the reactive foamable ingredients. With needle valve 12 in the open position, the frothing agent in liquid phase flows from tank 10 into conduit 13. A low pressure flowmeter 14 monitors flow of the liquid frothing agent through conduit 13. Check valve 15 and ball valve 16 are provided in conduit 13 to ensure no backup of material toward storage tank 10. Frothing agent conduit 13 opens at "T"-intersection 17 into a conduit conveying one of the reactive components in liquid phase in the direction indicated by the arrow toward a mixing device (see below). The pressure of the frothing agent and reactive component are measured by gauges 19 and 20, respectively. The pressures are regulated so that the pressure of the frothing agent in conduit 13 (e.g., 180 p.s.i.) is higher than that of the reactive component (e.g., 100 p.s.i.) in the conduit into which conduit 13 empties. A static mixer (not shown) can be provided downstream of intersection 17 to ensure complete mixing of ingredients.

Utilization of the frothing agent in the froth foaming process of the invention can be illustrated with reference to the apparatus shown in FIG. 2. The apparatus includes tanks 22, 23 and 24 for containing the foamable ingredients and additives such as surfactant, dye, blowing agent, etc. In operation, the tanks are charged with the foam forming mixture in whatever manner is convenient and preferred for the specific polymer. For instance, in the production of a urethane or isocyanurate foam, the foam forming mixture can be divided into three liquid components, with the polyisocyanate in tank 22, the polyol in tank 23, and catalyst in tank 24, each respectively being pumped (pumps not shown) to outlet lines 18, 25 and 26. The lines 18, 25 and 26 form the inlet to high pressure metering pumps 27, 28 and 29. The pumps 27, 28 and 29 discharge respectively through lines 30, 31 and 32. Lines 31 and 32 comprise branches which open into line 33, and lines 30 and 33 are in turn respectively connected to flexible lines 34 and 35. The flexible lines 34 and 35 discharge to mixing head 36. The apparatus is also provided with a roll 37 of lower glass fiber mat material 38, and a roll 37' of upper glass fiber mat material 38'. The apparatus is also provided with metering rolls 39 and 40, and an oven 41 provided with vents 42 and 42' for introducing and circulating hot air. The apparatus also includes pull rolls 43 and 44, each of which preferably has a flexible outer sheath 45 and 46, and cutting means 47a for cutting off side edge excess material and 47b for severing the glass faced foam plastic produced by this process into finite lengths, thereby producing discrete panels.

Referring specifically to the production of glass faced polyisocyanurate foam, tak 22 is charged with an organic polyisocyanate admixed with a blowing agent and a surfactant, tank 23 is charged with a polyol, and tank 24 is charged with a catalyst composition. The speeds of the pumps 27, 28 and 29 are adjusted to give the desired ratios of the ingredients contained in the tanks 22, 23 and 24, whereupon these ingredients pass respectively into lines 18, 25 and 26. As shown in FIG. 2, the frothing agent is injected into line 18 upstream of high pressure metering pump 27. The liquid frothing agent mixes with the reactive component, and the mixture passes through conduit 18 to pump 27. Metering pumps 27, 28 and 29 drive the foamable ingredients at an elevated pressure, such as 800 to 2500 p.s.i., through lines 30, 31 and 32, as well as lines 33, 34 and 35, whereupon they are mixed in the mixing head 36 and deposited through pour spout or nozzle 48 as a frothed foam mixture 49 on fibrous material 38.

The porosity of fibrous material 38 is suitably controlled to permit sufficient penetration of the mat by the frothed foam mixture to provide integral attachment of the cured foam to the mat, but not an excessive amount of penetration which would be wasteful. Controllable factors influencing the degree of penetration of the froth into the fibrous layer(s) include the size, quantity and distribution of the fibers in the layer(s), and the nature of the binder in the layer(s), as well as the chemical composition and viscosity of the froth and the processing temperatures. For example, in the case of certain mats of high porosity, such as those made from coarser fibers, thicker or heavier weight versions of the mats and/or froths of high viscosity can be employed to ensure workability.

Advantageously, fibrous material 38 comprises a mat of chopped, relatively short glass fibers, typically having lengths in a range of about $\frac{1}{4}$ to 2 inch. Generally, the fibers have diameters of about 0.00035 to 0.00065 inch. The mat can consist of a mixture of fibers of different sizes. The fibers of the mat are bonded together with a binder, such as an acrylic, epoxy, polyester, urea formaldehyde, ethylene-vinyl chloride, polyvinyl acetate, phenolic or melamine binder. The fiber binder is present in a relatively minor amount, such as 10 to 30% by weight of the finished mat. The mat has a weight from about 1 to 3 pounds per hundred square feet. The glass fiber mat can be produced by a number of conventional wet or dry processes which result in a random orientation and uniform mechanical properties throughout the facer. The thickness of the mat can vary between about 15 to 55 mils, and preferably ranges between about 26 to 34 mils. A highly suitable glass fiber mat for the process of the invention is a mat of chopped H-$\frac{1}{2}$ inch glass fibers produced by a conventional wet-laid, non-woven process, wherein the liquid treatment of the fibers results in a random pattern. An acrylic binder is preferred. However, a polyvinyl acetate or other suitable binder can be used.

By virtue of rotation of the pull rolls 43 and 44, the lower glass fiber mat 38 is pulled from the roll 37, and the upper glass fiber mat 38' is pulled from the roll 37'. Advantageously, upper glass fiber mat 38' is substantially similar to the mat 38 on the lower surface. The mixing head 62 can be caused to move back and forth a short distance across mat 38 by virtue of a reciprocating means 72. In this manner, an even amount of frothed foam mixture 49 can be maintained upstream from the nip 50 and in contact with the mat 38 of glass fibers. The glass fiber mats 38 and 38' having the frothed foam mixture therebetween pass from the upstream end of the apparatus through the nip 50 between the two rotating metering rolls 39 and 40 and on downstream. The conveyor means illustrated in FIG. 2 thus comprises the continuously advancing lower glass fiber mat moving along over rollers 51. Where only a lower glass fiber mat is used, the upper mat can be replaced with a web coated with a release agent. The start or upstream end of the production line includes a smooth-topped platform or bed 52 which extends from upstream of the deposition point of the frothed mixture to a point upstream of and adjacent nip 50 of the metering rolls. As shown in FIG. 2, bed plate 52 is positioned in an approximately horizontal plane such that lower mat 38 moves along its upper surface as the mat advances downstream toward nip 50. Bed plate 52 is adjustably mounted so that it can be inclined from the horizontal to elevate its downstream transverse edge (adjacent nip 50) above its upstream transverse edge.

A preferred deposition of froth chemicals results when mixing head 36, which suitably is a high pressure impingement mixing chamber, deposits the foamable chemicals through a device capable of laying down a wide band of froth on lower mat 38. A preferred device for this purpose is a FloodJet ® nozzle attached by connection means 53 to mixing head 36. This nozzle is supplied by Spraying Systems Co., Wheaton, Ill. The nozzle 48 can be oscillated transversely a short distance to either side of a central point above mat 38. As shown in FIGS. 3 and 4, the nozzle 48 spreads a very wide pattern of froth 49 on mat 38 just upstream of nip 50, resulting in a shallow, uniform, controllable chemical bank. The position of nozzle 48 above bed plate 52 can be varied to accommodate whatever chemical throughput is being delivered to the production line. Provision also is made for variations in chemical throughput by using in each case a nozzle 48 with orifice size suitable for the particular throughput.

Immediately downstream of the laydown point, in the direction of conveyor travel, upper glass fiber mat 38′ is brought into contact with the frothed mixture-coated surface of glass layer 38. As illustrated in FIG. 2, this is suitably effected by passing upper mat 38′ around metering roll 40 and through nip 50. In another embodiment of the invention, the frothed mixture can be dispensed through nozzle 48 onto the exposed surface of mat 38′ as the latter passes around roll 40. In any event, at metering rolls 39 and 40 the upper and lower glass fiber mat facers are brought together in surface-to-surface opposition relative to each other, with the frothed mixture sandwiched in between.

The nip or gap 50 formed between the metering rolls 39 and 40 is accurately adjustable so as to insure contact of the frothed mixture with the glass fibers and cause uniform distribution of the mixture, as well as uniform metering of the amount retained, as the glass fiber mats advance beyond this point. That is, as the mats are brought into closely spaced adjacency at the metering rolls, a rolling bank of frothed mixture is built up so that there is a surplus always available to pass through the nip of the rolls. To provide for a precise adjustment of the nip gap, the upper roll is preferably mounted on an adjustable support which permits the distance between its axis and the axis of the lower metering roll to be varied so tht the nip between the rolls can be adjusted from a wide gap to almost a zero setting. This arrangement provides a precise control of the final thickness in the resulting foam board, assuming the frothed mixture is allowed to further expand thereafter substantially freely to develop its natural rise profile. The metering rolls thus serve as a means for bringing the mat facers into spaced conjunction, and for distributing the frothed mixture therebetween, as well as performing a final metering operation, supplementing the initial rough metering afforded by nozzle 48.

After passing between the nip of the two rolls 39 and 40, the composite structure 54 now comprises a lower and upper glass fiber mat 38 and 38′ having therebetween a frothed mixture 49 which penetrates somewhat into the interstices between the glass fibers of the mats. This composite structure 54 now passes into oven 41 and on along the generally horizontally extending coneyor. While in the oven 41 the frothed mixture further expands in an expansion zone 55. This expansion is initiated by heat generated in an exothermic reaction between the components of the frothed mixture 49. The temperture within the oven 41 is controlled by varying the temperature of the hot air from vents 42 and 42′ in order to insure that the oven temperature is maintained within the desired limits of 150° F. to 275° F. and preferably 175° F. and 250° F. The foam 56, under the influence of the heat added to the oven 41, cures to form glass faced foam plastic 57. The product 57 then leaves the oven 41, passes between the pull rolls 43 and 44, and is cut by side edge and length cutting means 47a and 47b into finite lengths, thereby forming discrete panels 58 and 58′ of the product.

A restrained rise production line for producing glass faced polyisocyanurate foam in accordance with the invention is schematically shown in FIG. 5. While the introduction of frothing agent into one of the reactive components, pumping and mixing of ingredients, and subsequent laydown onto the lower fibrous layer can be accomplished in the restrained rise process just as in the above-described free rise system, several variations in technique are illustrated in FIG. 5. Low pressure feed pumps 59, 60 and 61 deliver metered quantities of the foamable ingredients to outlet lines leading downstream toward the mixing head 62 at pressures, for example, of about 60 to 150 p.s.i. The frothing agent is introduced at intersection 17 into the conduit which carries the isocyanate-containing component from tank 22, and thorough mixing of the latter component and frothing agent is accomplished in static mixer 21, whence the stream proceeds toward mixing head 62. Three flexible lines 63, 64 and 65 for the polyisocyanate-containing component, the polyol component and the catalyst composition, respectively, discharge to mixing head 62. A mixing head which can be preferably employed is a foam mixer manufactured by Martin-Sweets Co., Louisville, Ky. A suitable mixer contained in the housing of mixing head 62 contributes to a thorough mixing of the foamable chemicals. A conduit (not shown) leading from a supply of air can be connected to any of the three lines leading to foam head 62 to provide nucleation.

With mixing head 62 oscillated transversely a short distance to either side of a central point above mat 38, a smooth stream of froth is deposited through nozzle 48 onto fibrous mat 38 in a uniform, shallow, wide band at a point upstream from where the upper mat 38′ passes around roller 66 and then into oven 41. Lower and upper endless conveyor belts 67 and 68 are positioned in oven 41 to contain the expanding foam therebetween. Mats 38 and 38′ are drawn along the opposed surfaces of conveyors 67 and 68, respectively. Both endless conveyors 67 and 68 can comprise a series of articulated platens, such as described in U.S. Pat. No. 4,043,719, the disclosure of which is incorporated herein by reference. The platens are supported on and run over rollers.

The distance between the horizontal planes of the facing portions of conveyors 67 and 68 can be preset to determine the thickness of the final board. This distance is suitably less than the combined thickness of fibrous mats 38 and 38′ and the foam which would otherwise result if the frothed mixture 49 were allowed to foam unrestrictedly. As the frothed mixture further expands upwardly, it comes into contact with the mat 38′, forcing the mat against conveyor 68 and causing mat 38′ to assume a substantially planar disposition on the upper correspondingly planar surface of foam 56. The frothed mixture penetrates the upper surface of fibrous mat 38 when distributed thereon and under the influence of the compression between conveyors 67 and 68. Similarly, the upper surface of the frothed mixture penetrates the mat 38′ as the foam presses the mat against conveyor 68 and penetrates the interstices of the mat. Accordingly, the foam becomes securely interlocked with the fibrous layers on its major surfaces. Curing of the foam in oven 41 and subsequent processing are accomplished in the manner hereinbefore described. Rollers (not shown) are located downstream of oven 41 to move product 57 along the line.

Figure 6:
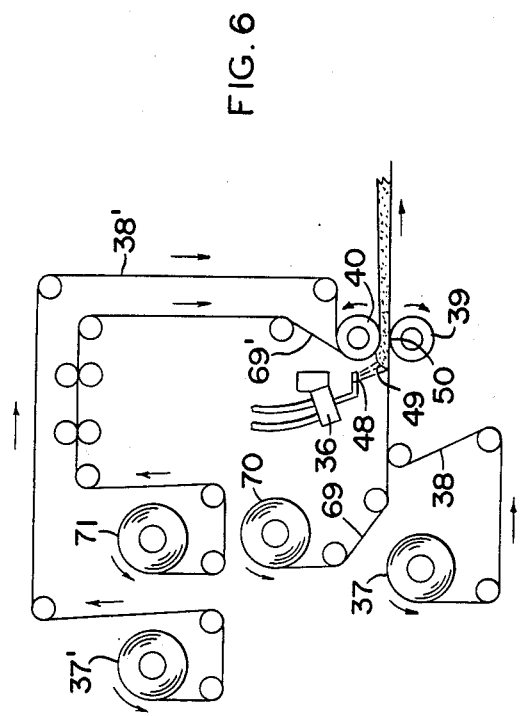
FIG. 6 is a schematic elevation of a portion of the apparatus of FIG. 2 showing two additional glass fiber mats being fed to the nip roll for additional reinforcement of the product.

Referring now to FIG. 6, the apparatus is the same as that shown in FIG. 2 but here lower and upper reinforcing webs 69 and 69' are being fed into the apparatus. Alternatively, a single reinforcing web can be fed into the apparatus. The webs can be made from threads or yarns of any material which is non-flammable and dimensionally stable, particularly material which is stable to temperature changes. Fiberglass fibers are generally preferred for most applications. For example, in a preferred embodiment the reinforcing webs will be the type of glass mat used in producing the structural laminate of U.S. Pat. No. 4,028,158, i.e., a mat of long, generally straight glass fibers. Advantageously, the glass fibers of the mat are arranged in layers and the direction of the glass fibers in each layer is at an angle to the direction of the glass fibers in each next adjacent layer.

As shown in FIG. 6, two thin mats 69 and 69' of glass fibers are fed from rolls 70 and 71, respectively, toward the nip 50 between the two rotating metering rolls 39 and 40. By virtue of rotation of the pull rolls 43 and 44, the lower fibrous mat 38 and fibrous reinforcing mat 60 and upper fibrous mat 38' and fibrous reinforcing mat 69' are pulled from their respective rolls. At the metering rolls the reinforcing mat 69 and mat 38 below it are brought together in surface-to-surface opposition relative to each other, and the frothed mixture 49 is deposited onto glass fiber mat 69. The upper mat 38' and reinforcing mat 69' also come into surface-to-surface contact as they are passed around metering roll 40 and through nip 50. The two upper mats and two lower mats, having the frothed mixture 49 therebetween, pass through the nip 50 of the two rotating metering rolls. The frothed mixture penetrates the interstices between the glass fibers of mats 38, 38', 69 and 69'. Thereafter, further expansion of the frothed mixture and curing of the foam are accomplished in oven 41 in the manner hereinbefore described. Under the influence of the expanding froth, reinforcing mats 69 and 69' are pushed to positions adjacent facing mats 38 and 38', respectively, in the resulting structural laminate.

In a preferred embodiment, the plastic foam core 56 is a polyisocyanurate or polyurethane. These foams can be prepared by mixing together an organic polyisocyanate with a polyol, catalyst and frothing or blowing agent(s) at temperatures ranging from about 0° C. to 150° C. The polyisocyanurate foams generally are prepared by reacting the polyisocyanate and polyol in an equivalent ratio of 1.5:1 to 6:1 and preferably 2:1 to 5:1. The polyurethane foams are prepared by reacting the polyol and polyisocyanate on an approximately 1:1 equivalent basis.

In the broadest aspects of the present invention, any organic polyisocyanate can be employed in the preparation of the foams of the present invention. The organic polyisocyanates which can be used include aromatic, aliphatic and cycloaliphatic polyisocyanates and combinations thereof. Representative of these types are the diisocyanates such as m-phenylene diisocyanate, toluene-2, 4-diisocyanate, toluene-2,6-diisocyanate, mixtures of 2,4- and 2,6-toluene, diisocyanate, hexamethylene-1, 6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenylmethane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4,4'-diisocyanate; the triisocyanates such as 4,4',4''-triphenylmethanetriisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. Especially useful are polymethylene polyphenylisocyanates. These isocyanates are prepared by conventional methods known in the art such as the phosgenation of the corresponding organic amine.

The polymethylene polyphenylisocyanates desirably have a functionality of at least 2.1 and preferably 2.5 to 3.8. These preferred polymethylene polyphenylisocyanates generally have an equivalent weight between 120 and 180 and preferably have an equivalent weight between 130 and 145. The friability of foams made with these polyisocyanates is desirably less than 30%, preferably less than 20%.

A preferred subclass of polymethylene polyphenylisocyanates especially useful in the present invention is a mixture of those of the following formula:

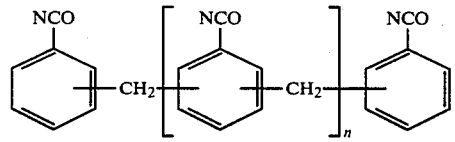

wherein n is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The synthesis of polymethylene polyphenylisocyanates is described in Seeger et al., U.S. Pat. No. 2,683,730 and in Powers U.S. Pat. No. 3,526,652 at column 3, lines 6–21. It should, therefore, be understood that the polymethylene polyphenylisocyanates available on the market under the tradenames of CODE 047 or PAPI-20 (Upjohn) and MR 200 (Mobay) can successfully be employed within the spirit and scope of the present invention.

The polyols which can be employed include, for example, monomeric polyols, such as ethylene glycol, 1,2-propanediol, 1,3-propanediol, 1,4-butanediol, diethylene glycol, dipropylene glycol, dimethylol dicyclopentadiene, 1,3-cyclohexanediol, 1,4-cyclohexanediol, the oxyalkylene adducts of polyol bases wherein the oxyalkylene portion is derived from a monomeric unit such as ethylene oxide, propylene oxide, butylene oxide and mixtures thereof. The polyol initiators include ethylene glycol, 1,2-propylene glycol, 1,3-propylene glycol, 1,2-butanediol, 1,4-butanediol, hexanetriol, glycerol, trimethylolpropane, triethylolpropane, pentaerythritol, sorbitol, sucrose, toluene diamine and bisphenol A, polyethers such as polyethylene ether glycols, polypropylene ether glycols, polytetramethylene ether glycols, and alkylene oxide adducts of polyhydric alcohols including those listed above; hydroxy terminated tertiary amines of the formula:

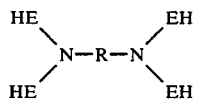

wherein R is an alkylene radical containing at least 2 to 6 carbon atoms and E is a polyoxyalkylene chain; amine based polyethers of the formula:

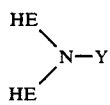

wherein E is a polyoxyalkylene chain and Y is selected from the group consisting of alkyl, hydroxyalkyl and EH; alkylene oxide adducts of acids of phosphorus such as the adducts prepared by the reaction of phosphoric acid and ethylene oxide, phosphoric acid and propylene oxide, phosphorus acid and propylene oxide, phosphonic acid and ethylene oxide, phosphinic acid and butylene oxide, polyphosphoric acid and propylene oxide and phosphonic acid and styrene oxide.

Typical polyether polyols include polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, and poly-1,4-oxybutylene and polyoxyethylene glycols, and random copolymer glycols prepared from blends or sequential addition of two or more alkylene oxides. Also adducts of the above with trimethylolpropane, glycerine and hexanetriol as well as the polyoxypropylene adducts of higher polyols such as pentaerythritol and sorbitol may be employed. Thus, the polyether polyols which can be employed in the present invention include oxyalkylene polymers which have an oxygen/carbon ratio from about 1:2 to 1:4 and preferably an oxygen carbon atom ratio from about 1:2.8 to 1:4 and from about 2 to 6 terminal hydroxyl groups, preferably about 2 to 4 terminal hydroxyl groups. The polyether polyols generally have an average equivalent weight from about 80 to 10,000 and preferably have an average equivalent weight from about 100 to about 6000. Polyoxypropylene glycols having molecular weights from about 200 to about 4000 corresponding to equivalent weights from about 100 to 2000 and mixtures thereof are particularly useful as polyol reactants. Polyol blends such as a mixture of high molecular weight polyether polyols with lower molecular weight polyether polyols or monomeric polyols can also be employed.

Any suitable hydroxy terminated polyester may also be used. These can be obtained from the reaction of polycarboxylic acids and polyhydric alcohols. Such suitable polycarboxylic acids may be oxalic acid, malonic acid, succinic acid, glutaric acid, adipic acid, pimelic acid, suberic acid, azelaic acid, sebacic acid, basillic acid, thapsic acid, maleic acid, fumaric acid, glutaconic acid, isophthalic acid and terephthalic acid. Suitable polyhydric alcohols include the following: ethylene glycol, 1,2-propylene glycol, 1,3-propylene glycol, 1,2-butylene glycol, 1,3-butylene glycol, 1,4-butylene glycol, 1,3-pentanediol, 1,4-pentanediol, 1,5-pentanediol, 1,6-hexanediol, 1,4-hexanediol, glycerol, trimethylolpropane, trimethylolethane, hexane 1,2,6-triol, α-methylglucoside, pentaerythritol, sorbitol, sucrose, and compounds derived from phenols such as 2,2-bis(4-hydroxyphenol)propane.

A preferred aromatic polyester polyol is prepared by the transesterification, with a glycol of molecular weight from about 60 to about 400, of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids. This residue is described in U.S. Pat. No. 3,647,759, the disclosure of which is hereby incorporated by reference. Two preferred transesterifying glycols which can be reacted with the residue are ethylene glycol and diethylene glycol, with the latter being more preferred. Examples of transesterified residues which can be used in accordance with the invention are those supplied by Hercules, Inc., Wilmington, Del. under the trade name of Terate ® resins.

An excess of the transesterifying glycol advantageously may be used to react with the residue defined above. The amount of this preferred excess of transesterifying glycol remaining in the transesterified polyol mixture can vary broadly but suitably falls within a range of from about 5 to about 30 percent by weight of said polyol mixture.

The properties of the above transesterified polyol mixtures which can be employed in accordance with the present invention fall within rather broad ranges. The polyol mixtures are described in U.S. Pat. No. 4,237,238, the disclosure of which is hereby incorporated by reference. A preferred polyol mixture is characterized by a viscosity in cps at 25° C. of about 1,600 to about 2,800, a free diethylene glycol content of from about 20 to about 30 percent by weight of said mixture, a hydroxyl number within a range of from about 400 to about 490, and an acid number of about 0.2 to about 8.

Another preferred aromatic polyester polyol which can be employed is prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials. An expecially useful polyol mixture can be prepared by transesterifying a by-product fraction from the manufacture of dimethyl terephthalate comprising a mixture of (a) about 40 to 60 percent by weight of dimethyl terephthalate,
(b) about 1 to 10 percent by weight of monomethyl terephthalate,
(c) about 1 to 2 percent by weight of terephthalate acid,
(d) about 10 to 25 percent by weight of bi-ring esters,
(e) about 5 to 12 percent by weight of organic acid salts, (f) about 18 to 25 percent by weight of polymeric materials, and (g) about 1 to 4 percent by weight of ash. An excess of the transesterifying glycol is advantageously used to react with the by-product fraction. Two preferred glycols for transesterifying the by-product fraction are ethylene glycol and diethylene glycol, with the latter being more preferred. An example of a transesterified by-product fraction of the invention is the product supplied by Jim Walter Resources, Inc. under the trade designation Foamol 250.

The properties of the polyol mixture produced by transesterifying the by-product fraction defined above are described in U.S. Pat. No. 4,411,949, the disclosure of which is hereby incorporated by reference. A preferred polyol mixture is characterized by a viscosity in cps at 25° C. of about 700 to about 2500, a free diethylene glycol content of from about 10 to about 30 percent by weight of said mixture, a hydroxyl number within a range of from about 350 to about 468, and an acid number of about 0.2 to about 10.

Another preferred polyol component comprises a blend of (a) about 5 percent to about 95 percent by weight of an aromatic polyester polyol having a molecular weight of from about 150 to about 5,000, such as one of the above aromatic polyester polyols or mixtures of these polyols, and (b) about 5 percent to about 95 percent by weight of an alkylene oxide adduct of an aromatic amine of the formula

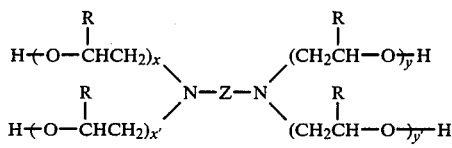

wherein Z is a divalent aromatic radical, x, x', y, and y' each independently have an average value from about 1 to about 5, and each R is independently selected from the group consisting of hydrogen, alkyl or aryl, provided that the adduct is capped with ethylene oxide units. A preferred alkoxylated aromatic amine of the blend is an ethylene oxide adduct of toluene diamine isomers of the formula

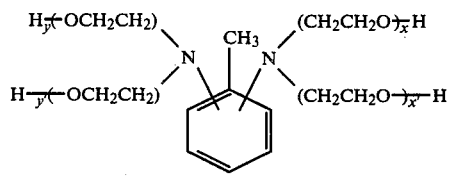

wherein the average number of oxyethylene units per polyoxyethylene chain is from 2 to 3. An example of a suitable, commercially available aromatic-amino polyether polyol of the blend is the product sold by BASF Wyandotte Corporation under the trademark Pluracol ® Polyol 735. The blend is described in U.S. application Ser. No. 541,197, filed Oct. 12, 1983, the disclosure of which application is hereby incorporated by reference.

In addition to the above hydroxy-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

Other polyols or mixtures of polyols can be employed in the production of the polyisocyanurate foam core of the invention. For example, other desirable polyols for use in the present invention are those described in U.S. Pat. No. 4,212,917, and in U.S. application Ser. No. 372,904, filed Apr. 29, 1982, the disclosures of which patent and application are hereby incorporated by reference.

Suitable catalysts for the foam preparations include the well known trimerization and urethane catalysts. Examples of trimerization catalysts are 1,3,5-tris(N,N-dialkylaminoalkyl)-s-hexahydrotriazines; the alkylene oxide and water adducts of 1,3,5-tris(N,N-dialkylaminoalkyl)-s-hexahydrotriazines; 2,4,6-tris(dimethylaminomethyl)-phenol; o-, p- or a mixture of o- and p-dimethylaminomethylphenol and triethylenediamine or the alkylene oxide and water adducts thereof, alkali metal carboxylates, alkali metal alkoxides, and organic boron-containing compounds. The urethane catalysts include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylenediamine, triethylamine, diethylcyclohexylamine, dimethylethanolamine, methylmorpholine, trimethylpiperazine, N-ethylmorpholine and diethylethanolamine may also be employed as well as mixtures of any of the above. The catalysts generally comprise from 0.1 to 20 and preferably from 0.3 to 10 weight percent of the total composition.

In the preparation of the polyisocyanurate rigid foams, the preferred catalysts give cream times of 15 to 30 seconds and firm times of 25 to 80 seconds. One preferred type of catalyst is a mixture of a tertiary amino phenol, such as 2,4,6-tris(dimethylaminomethyl)-phenol, and an alkali metal carboxylate, such as potassium-2-ethylhexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.3:1 to 2.5:1.

The frothing agent can be any material which is inert to the reactive ingredients and is easily vaporized at atmospheric pressure. The frothing agent advantageously has an atmospheric boiling point of −50° to 10° C., and includes dichlorodifluoromethane, monochlorodifluoromethane, trifluoromethane, monochlorotrifluromethane, monochloropentafluoroethane, vinylfluoride, vinylidene-fluoride, 1,1-difluoroethane, 1,1,1-trichlorodifluoroethane, and the like. Particularly preferred is dichlorodifluoromethane.

In the practice of the invention, a higher boiling blowing agent is desirably used in conjunction with the frothing agent. The blowing agent is a gaseous material at the reaction temperature and advantageously has an atmospheric boiling point ranging from about 10° to 80° C. Suitable blowing agents include trichloromonofluoromethane, 1,1,2-trichloro-1,2,2-trifluoroethane, acetone, pentane, and the like, preferably trichloromonofluoromethane.

It has been found advantageous to add the lower boiling frothing agent to the same reaction component which contains the higher boiling blowing agent. Those skilled in the art can readily determine an appropriate distribution of foaming agents and foamable ingredients in any particular foam preparation.

The combined frothing and blowing agents are employed in an amount sufficient to give the resultant foam the desired bulk density which is generally between 0.5 and 10, and preferably between 1 and 5 pounds per cubic foot. The foaming agents generally comprise from 1 to 30, and preferably comprise from 5 to 20 weight percent of the composition. The level of frothing agent in the foam forming mixture helps control the degree of penetration of the frothed chemicals into the fibrous mat. Too lttle frothing agent can cause too much penetration and contamination of equipment, while too much frothing agent can result in insufficient penetration and a weak bond between the foam and fibrous mat. The ratio of frothing agent to blowing agent will vary depending on the overall chemical composition, nature of the fibrous layer(s), and processing conditions, but the appropriate ratio for any particular foam system is readily determinable by those skilled in the art. For example, a fine-celled polyisocyanurate foam having a density in the range of about 1.5 to 2.5 lb/ft$^3$ can be produced by employing a total amount of frothing agent (e.g., dichlorodifluoromethane) and blowing agent (e.g., trichloromonofluoromethane) in the range of about 10 to 20 weight percent of the foam forming mixture, and suitable penetration of a mat of chopped, short glass fibers by the froth formed during the polyisocyanurate foam production can be achieved by utilizing a ratio of the frothing agent to blowing agent in the range of about 0.04:1 to 0.15:1. When the foaming agent has a boiling point at or below ambient, it is maintained under pressure until mixed with the other components. Alternatively, it can be maintained at subambient temperatures until mixed with the other components.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-5098". Other suitable surfactants are those described in U.S. Pat. No. 4,365,024 and U.S. application Ser. No. 490,279, filed May 2, 1983. Generally, the surfactant comprises from about 0.05 to 10, and preferably from 0.1 to 6, weight percent of the foam-forming composition.

Other additives may also be included in the foam formulations. Included are flame retardants, such as tris(2-chloroethyl)-phosphate, dispersing agents, plasticizers, fillers and pigments.

Although this invention has been illustrated in detail for boards wherein the foam is covered on one or both major surfaces solely with a fibrous layer(s), it also embraces a board having at least one but preferably both major surfaces faced with an impenetrable sheet material. Where two sheets are employed, they may be similar or dissimilar. Such sheet materials would include, but are not limited to metal, paper, corrugated cardboard, textiles, plastic, glass and wood. Flexible facing sheets constructed of flame-resistant materials are especially useful. Examples of such sheets are asbestos, metals, fire retardant papers, and composites thereof. In the broadest aspects of the invention, any metal can be employed, such as copper, brass, iron, steel, or aluminum. Aluminum is the preferred metal because of its ductility and the ease with which it can be manufactured into a material of suitable thickness.

The facing sheet(s), which is substantially impenetrable to the frothed mixture, is positioned in the finished product to the exterior of the fibrous layer(s) and, in the case where one of the foam surfaces has no fibrous covering, to the exterior of the foam core. Particularly suitable fibrous layers for use in combination with the impenetrable facing sheets are mats of chopped, short glass fibers and mats of long, generally straight glass fibers, such as those described in U.S. Pat. No. 4,028,158, the disclosure of which patent is hereby incorporated by reference. Where fibrous layers are utilized on both major surfaces of the insulation board, the layers may be the same or different. Incorporation of the exterior facing sheets onto the insulating board of the invention can be simply accomplished analogously to the method described in U.S. Pat. No. 4,028,158 for producing a structural laminate, i.e., by introducing each of the facing sheets together with and to the exterior of the respective fibrous layer(s) and, after depositing the frothed mixture on the lower fibrous layer(s) having an underlying facing sheet and covering the deposited frothed mixture with the upper fibrous layer(s) having any overlying facing sheet, passing the composite between the nip of two rotating rolls. The composite is thereafter passed into an oven for further expansion of the frothed mixture and curing of the foam. Under the influence of the expanding froth, each fibrous layer is pushed to a position adjacent to its facing sheet so as to provide an especially strong faced surface. The fibrous layers are advantageously incorporated into the structural laminate in an amount which will insure the continued structural integrity of the laminate when it is exposed to high temperature and open flames. For example, mats of glass fibers are functionally effective when included in the range of 1–24, preferably 2–20, gms/square foot of structural laminate.

In accordance with the process of the present invention, the partially expanded froth foam can be utilized in conjunction with a wide variety of fibrous layers or mats. The froth foaming process can be successfully accomplished even with relatively porous mats through which conventional liquid foam chemicals would penetrate to contaminate processing equipment. Even where more difficultly penetrable facing materials are contacted with the partially expanded froth foam, such as where the froth is deposited on a perlite board or fiberboard and covered by a glass fiber facer, the present process is highly advantageous because it brings about sufficient penetration of the facing material by the froth to ensure secure interlocking, but not excessive penetration which would be wasteful. The laminate produced possesses a combination of desirable properties. The fibrous mats which securely interlock with the major surfaces of the foam plastic core make the faced surfaces particularly tough and impact resistant. This strong interlocking also helps to prevent delamination of the core material from the fibrous facers. Furthermore, the structural panels are characterized by high dimensional stability and heat resistance, and are especially resistant to cracking and warping when subjected to adverse conditions. Laminates of the invention exhibit both excellent insulation properties as well as superior fire resistant properties, which qualify for model building code approvals and approval by the Factory Mutual Research Corporation. For example, glass faced polyisocyanurate foam insulation boards of the invention have received an FM Class I rating for insulated steel deck roofs.

The present invention is further illustrated by the following examples in which all parts and percentages are by weight unless otherwise indicated.

EXAMPLE I

This example illustrates the process of the present invention for producing an insulation board in a free-rise mode by reference to FIGS. 1, 2, 3 and 4 of the drawings.

A. ISOCYANURATE FORMULATION USED IN PREPARING FOAM CORE OF INSULATION BOARD

The following isocyanurate formulation was used in preparing the foam core of the insulation board.

| Item | Ingredient | Parts by Weight |
|---|---|---|
| A | Polymethylene polyphenyl isocyanate[1] | 230 |
| B | Aromatic polyester polyol[2] | 70 |
| C | Trichloromonofluoromethane | 50 |
| D | Dichlorodifluoromethane | 4.4 |
| E | Polydimethylsiloxane polyoxyalkylene copolymers[3] | 3.5 |
| F | 2,4,6-tris(dimethylaminomethyl)phenol[4] | (See below) |
| G | Potassium-2-ethylhexoate[4] | " |
| H | Diethylene glycol[4] | " |

[1]Item A is a polymethylene polyphenyl isocyanate having an equivalent weight of 140, an acidity of 0.03% HCl, and a viscosity of 2000 centipoises at 25° C. and is available from the Mobay Chemical Company, Pittsburgh, Pa. under the trade name MONDUR MR-200.
[2]Item B is that supplied by Jim Walter Resources, Inc. under the trade name Foamol 250.
[3]Item E is a surfactant supplied by the Union Carbide Corporation under the trade name L-5340.
[4]Items F and G are employed in the form of a solution in the diethylene glycol (item H).

The catalytic composition of items F, G and H is a blend of 2,4,6-tris(dimethylaminomethyl)phenol:potassium-2-ethylhexoate:diethylene glycol in a 1:6:6 weight ratio. The throughput of the catalytic blend employed in producing the insulation board was adjusted to give a foam reactivity characterized by a cream time of 20 seconds and a firm time of 45 seconds. This reactivity was established at the beginning of foam production employing all ingredients except the frothing agent (item D). After establishment of this reactivity, the introduction of frothing agent into the system and manufacture of the insulation board commenced.

B. PRODUCTION AND PROPERTIES OF INSULATION BOARD

The production of the insulation board can be illustrated with reference to the drawings. Referring now to FIG. 2, items A, C and E were mixed with each other and placed in tank 22 under mild refrigeration. Item B was placed in tank 23, and a solution of items F and g in item H was placed in tank 24. The frothing agent (item D) in tank 10 (see FIG. 1) was maintained at a pressure of 180 p.s.i. The apparatus was provided with rolls 37', 37 of top and bottom glass fiber mats. Both facer mats 38' and 38 were composed of chopped H-½ inch glass fibers oriented in a random pattern and bonded with an acrylic binder comprising about 20 weight percent of each mat. The total weight of each fiber glass facer mat was approximately 2.2 lb per 100 ft².

Oven 41 was heated to provide a zone above vent 42 at a temperature of about 185° F., and a zone above vent 42' of about 203° F. The fiber glass facer mats were fed toward the nip of metering rolls 39 and 40, and the high pressure pumps 27, 28 and 29 were started to pump the contents of the tanks 22, 23 and 24 through the respective feed lines and to the high pressure impingement mixing head 36. Item D at a pressure of 180 p.s.i. was injected at T-intersection 17 into the isocyanate-containing component which was delivered from tank 22 through conduit 18 at a pressure of 100 p.s.i. Mixing of the ingredients in conduit 18 was accomplished without the use of a static mixer and the resulting mixture was raised in pressure to 1200 p.s.i. in pump 27, after which the mixture entered line 30. The temperatures of the three streams flowing through lines 30, 31 and 32 were determined to be 60°, 70° and 78° F., respectively. The stream from line 30 passed through line 34, and those from lines 31 and 32 merged in line 35 and flowed toward the mixing head, where all ingredients were thoroughly mixed. As shown in FIGS. 3 and 4, all ingredients were deposited from the mixing head through Flood-Jet ® nozzle 48 as a wide band of froth 49 on lower glass fiber mat 38 just upstream of the nip of the metering rolls, and then both the upper and lower glass fiber mats and frothed mixture were conveyed into the oven 41 to produce an approximately 2 inch thick glass faced structural panel.

The glass faced insulation board was produced with a degree of chemical penetration only sufficient to fully impregnate the facer mats, and the panel exhibited good overall flatness. The board had good dimensional stability and the glass facers strongly adhered to the foam core. In addition, the following physical properties of the insulation board were determined:

| | |
|---|---|
| Density | 1.87 lb/ft³ |
| Oxygen index according to ASTM D-2863-70, except that a sample measuring ¼" × ¼" × 6" was used | 24.50 |
| Closed cell content according to ASTM D-2856-70 | 85.7% |
| Friability according to ASTM C-421 | 12.6% |
| Initial k-factor | 0.127 Btu-in/hr-ft²-°F. |

EXAMPLE 2

This example illustrates the process of the present invention for producing two insulation boards in a restrained-rise mode by reference to FIGS. 1 and 5 of the drawings.

A. ISOCYANURATE FORMULATIONS USED IN PREPARING FOAM CORE OF INSULATION BOARDS

The isocyanurate formulations used in preparing the foam core of the boards are shown in the following Table I. Isocyanurate formulations 1 and 2 of Table I were employed in the production of insulation boards 1 and 2, respectively, of this example.

B. PRODUCTION AND PROPERTIES OF INSULATION BOARDS

The following procedure, which can be illustrated with reference to the drawings, was utilized in the production of both insulation boards.

Referring now to FIG. 5, items A, C and E were mixed with each other and placed in tank 22 under mild refrigeration. Item B (in the case of insulation board 1) or items B and B' (in the case of insulation board 2) were placed in tank 23, and a solution of items F and G in item H was placed in tank 24. The frothing agent (item D) in tank 10 (see FIG. 1) was maintained at a pressure of 180 p.s.i. For both boards 1 and 2, the apparatus was provided with rolls 37', 37 of top and bottom glass fiber mats 38' and 38, which were composed of chopped K-1 inch glass fibers oriented in a random pattern and bonded with an acrylic binder comprising about 20 weight percent of each mat. The total weight of each fiber glass facer mat was approximately 2.5 lb per 100 ft$^2$.

Oven 41 was maintained at a temperature of 180° F. The fiber glass facer mats were fed toward the opening into the oven, and the low pressure pumps 59, 60 and 61 were started to pump the contents of the tanks 22, 23 and 24 through the resepctive feed lines and to the Martin-Sweets mixing head 62. Item D at a pressure of 180 p.s.i. was injected at T-intersection 17 into the isocyanate-containing component delivered from tank 22 through conduit 18 at a pressure of 100 p.s.i., and the ingredients were thoroughly mixed in static mixer 21. The temperatures of the three streams flowing through the lines leading from pumps 59, 60 and 61 were determined to be 60°, 70° and 76° F., respectively, in the case of insulation board 1, and 60°, 70° and 72° F., respectively, in the case of insulation board 2. All ingredients were deposited from the mixing head through a Flood-Jet ® nozzle as a wide band of froth on lower glass fiber mat 38 at a point upstream from where the upper mat 38' passes around roller 66, and then both the upper and lower glass fiber mats and frothed mixture were conveyed into the oven 41 to produce a glass faced structural panel.

Both insulation boards 1 and 2 were approximately 2 inch thick and exhibited good overall flatness. Each board was produced with a degree of chemical penetration only sufficient to fully impregnate the facer mats. Each board had good dimensional stability and its glass facers strongly adhered to the foam core. Various other physical properties of the insulation boards are reported in Table II below.

TABLE I

| | | ISOCYANURATE FORMULATION | |
|---|---|---|---|
| | | 1 | 2 |
| Item | Ingredient | (parts by weight) | |
| A | Polymethylene polyphenyl isocyanate[1] | 230 | 213 |
| B | Aromatic polyester polyol[2] | 70 | 54.2 |
| B' | Aromatic-amino polyether polyol[3] | — | 23.2 |
| C | Trichloromonofluoromethane | 50 | 55.5 |
| D | Dichlorodifluoromethane | 4.1 | 3.6 |
| E | Polydimethylsiloxane polyoxyalkylene copolymers[4] | 3.5 | 3.5 |
| F | 2,4,6-tris(dimethylaminomethyl) phenol[5] | (See below) | (See below) |
| G | Potassium-2-ethylhexoate[5] | " | " |
| H | Diethylene glycol[5] | " | " |

[1]Item A is a polymethylene polyphenyl isocyanate having an equivalent weight of 138, an acidity of 0.03% HCl, and a viscosity of 2000 centipoises at 25° C. and is available from the Mobay Chemical Company, Pittsburgh, Pa. under the trade name MONDUR MR-200.
[2]Item B is that supplied by Jim Walter Resources, Inc. under the trade name Foamol 250.
[3]Item B' is that supplied by BASF Wyandotte Corporation under the trade name Pluracol ® Polyol 735.
[4]Item E is a surfactant supplied by the Union Carbide Corportation under the trade name L-5340.
[5]Items F and G are employed in the form of a solution in the diethylene glycol (item H). The catalytic compositon of items F, G and H is a blend of 2,4,6-tris (dimethylaminomethyl) phenol: potassium-2-ethylhexoate: diethylene glycol in a 1:6:6 weight ratio. The throughput of the catalytic blend of formulation 1 was adjusted to give a foam reactivity characterized by a cream time of 14 seconds and a firm time of 30 seconds, and the throughput of the catalytic blend of formulation 2 was adjusted to give a foam having a cream time of 21 seconds, a gel time of 38 seconds, a firm time of 48 seconds and a tack-free time of 48 seconds. In each case, the reactivity was established at the beginning of foam production employing all ingredients except the frothing agent (item D). After establishment of the reactivity, the introduction of frothing agent into the system and manufacture of the respective insulation board commenced.

TABLE II

PROPERTIES OF INSULATION BOARDS

| Insulation Board | Density (lb/ft$^3$) | Oxygen Index[1] | Closed Cells (%)[2] | Friability[3] (%) | Initial k-factor[4] |
|---|---|---|---|---|---|
| 1 | 1.98 | 25.25 | 89.2 | 19.4 | 0.117 |
| 2 | 1.92 | 23.75 | 90.5 | 13.86 | 0.130 |

[1]According to ASTM D-2863-70, except that a sample measuring ½" × ½" × 6" was used.
[2]According to ASTM D-2856-70.
[3]According to ASTM C-421.
[4]Units = Btu-in/hr-ft$^2$-°F.

We claim:

1. A method for continuously producing an insulation board comprising a rigid plastic foam core having two major surfaces and a facing material on at least one of the major surfaces, the method comprising:
   (a) conveying a facing material along a production line,
   (b) depositing a partially expanded froth foam, which contains at least one frothing agent, on the facing material, the partially expanded froth foam comprising a mixture for forming a rigid polymer foam selected from the group consisting of polyurethane, polyisocyanurate, phenolic polymer, polyester and epoxide foams, and the frothing agent being easily vaporizable at atmospheric pressure, and
   (c) further expanding and curing the froth foam in contact with the facing material to form the insulation board.

2. The method of claim 1 for continuously producing an insulation boad having fibrous layers on both major surfaces of a foam core comprising:
   (a) conveying at least one lower fibrous layer along a production line,
   (b) depositing the partially expanded froth foam on the lower fibrous layer,
   (c) placing at least one advancing upper fibrous layer on the deposited, partially expanded froth foam to form an advancing sandwich of upper and lower fibrous layers and intermediate froth foam, and
   (d) further expanding and curing the froth foam in contact with the fibrous layers to form a rigid plastic foam core covered on both major surfaces with and penetrating interstices of the fibrous layers.

3. The method of claim 1 for continuously producing an insulation board having fibrous layers on both major surfaces of a foam core comprising:
   (a) conveying at least one lower fibrous layer along a production line,
   (b) depositing the partially expanded froth foam on the lower fibrous layer,
   (c) placing at least one advancing upper fibrous layer on the deposited, partially expanded froth foam to form an advancing sandwich of upper and lower fibrous layers and intermediate froth foam,
   (d) passing the sandwich through the nip of two rotating rolls to meter the amount of froth foam and help it to penetrate the interstices of the fibrous layers, and
   (e) thereafter passing the sandwich from the nip of the two rotating rolls into a heated expansion zone, whereby the froth foam further expands and cures in contact with the fibrous layers to form a rigid plastic foam core covered on both major surfaces with and penetrating interstices of the fibrous layers.

4. The method of claim 3 wherein:
   (a) a lower facing sheet is supplied below the lower fibrous layer and both lower facing sheet and fibrous layer are conveyed along the production line,
   (b) the partially expanded froth foam is deposited on the lower fibrous layer,
   (c) an advancing upper facing sheet is supplied above the advancing upper fibrous layer and both upper facing sheet and fibrous layer are placed on the deposited, partially expanded froth foam to form an advancing sandwich of upper and lower facing sheets and intermediate fibrous layers and froth foam,
   (d) the sandwich is passed through the nip of two rotating rolls to meter the amount of froth foam and help it to penetrate the interstices of the fibrous layers, and
   (e) thereafter the sandwich is passed from the nip of the two rotating rolls into a heated expansion zone, whereby the froth foam further expands and cures in contact with the fibrous layers and facing sheets to form a rigid plastic foam core covered on both major surfaces with and penetrating interstices of the fibrous layers and having adherent facing sheets exterior to the fibrous layers.

5. The method of claim 3 wherein the partially expanded froth foam comprises a mixture for forming a rigid polymer foam selected from the group consisting of polyurethane and polyisocyanurate foams.

6. The method of claim 5 wherein the partially expanded froth foam is formed from at least two liquid components including a polyisocyanate-containing component and a polyol-containing component, the steps of forming the froth foam comprising:
   (a) providing the liquid components, a low boiling blowing agent being premixed with either the polyisocyanate-containing component or the polyol-containing component,
   (b) passing the liquid components through separate conduits which discharge into a mixing head,
   (c) charging one of the liquid components in its conduit with a volatile liquid frothing agent, the boiling point of the frothing agent being lower than that of the blowing agent,
   (d) mixing the liquid components after their discharge into the mixing head,
   (e) discharging the resulting mixture from the mixing head into a depositing means, and
   (f) depositing the mixture from the depositing means onto the lower fibrous layer in the form of a partially expanded froth foam.

7. The method of claim 6 wherein:
   (a) each of the upper and lower fibrous layers comprises a mat of chopped, short glass fibers held together by a binder, and
   (b) the mixture from the mixing head is deposited by a nozzle capable of laying down a wide band of froth foam on the lower fibrous layer.

8. The method of claim 1 for continuously producing an insulation board having fibrous layers on both major surfaces of a foam core comprising:
   (a) conveying at least one lower fibrous layer along a production line,
   (b) depositing the partially expanded froth foam on the lower fibrous layer,
   (c) placing at least one advancing upper fibrous layer on the deposited, partially expanded froth foam to form an advancing sandwich of upper and lower fibrous layers and intermediate froth foam, and
   (d) passing the sandwich between a pair of substantially horizontal, vertically spaced continuous conveyors to limit the maximum distance the outer surfaces of the fibrous layers can move apart, the conveyors being located in a heated expansion zone, whereby the froth foam further expands to the extent permitted by the conveyors and cures in contact with the fibrous layers to form a rigid plastic foam core covered on both major surfaces with and penetrating interstices of the fibrous layers.

9. The method of claim 8 wherein:
   (a) a lower facing sheet is supplied below the lower fibrous layer and both lower facing sheet and fibrous layer are conveyed along the production line,
   (b) the partially expanded froth foam is deposited on the lower fibrous layer,
   (c) an advancing upper facing sheet is supplied above the advancing upper fibrous layer and both upper facing sheet and fibrous layer are placed on the deposited, partially expanded froth foam to form an advancing sandwich of upper and lower facing sheets and intermediate fibrous layers and froth foam, and
   (d) the sandwich is passed between a pair of substantially horizontal, vertically spaced continuous conveyors to limit the maximum distance the outer surfaces of the facing sheets can move apart, the conveyors being located in a heated expansion zone, whereby the froth foam further expands to the extent permitted by the conveyors and cures in contact with the fibrous layers and facing sheets to form a rigid plastic foam core covered on both major surfaces with and penetrating interstices of the fibrous layers and having adherent facing sheets exterior to the fibrous layers.

10. The method of claim 8 wherein the partially expanded froth foam comprises a mixture for forming a rigid polymer foam selected from the group consisting of polyurethane and polyisocyanurate foams.

11. The method of claim 10 wherein the partially expanded froth foam is formed from at least two liquid components including a polyisocyanate-containing component and a polyol-containing component, the steps of forming the froth foam comprising:
 (a) providing the liquid components, a low boiling blowing agent being premixed with either the polyisocyanate-containing component or the polyol-containing component,
 (b) passing the liquid components through separate conduits which discharge into a mixing head,
 (c) charging one of the liquid components in its conduit with a volatile liquid frothing agent, the boiling point of the frothing agent being lower than that of the blowing agent,
 (d) mixing the liquid components after their discharge into the mixing head,
 (e) discharging the resulting mixture from the mixing head into a depositing means and
 (f) depositing the mixture from the depositing means onto the lower fibrous layer in the form of a partially expanded froth foam.

12. The method of claim 11 wherein:
 (a) each of the upper and lower fibrous layers comprises a mat of chopped, short glass fibers held together by a binder, and
 (b) the depositing means comprises a nozzle capable of laying down a wide band of froth foam on the lower fibrous layer.

13. The method of claim 1 wherein the deposited, partially expanded froth foam contains a blowing agent which boils higher than the frothing agent.

14. The method of claim 13 wherein the frothing agent is dichlorodifluoromethane and the blowing agent is trichloromonofluoromethane.

15. The method of claim 2 wherein the deposited, partially expanded froth foam contains a blowing agent which boils higher than the frothing agent.

16. The method of claim 15 wherein the frothing agent is dichlorodifluoromethane and the blowing agent is trichloromonofluoromethane.

17. The method of claim 3 wherein the deposited, partially expanded froth foam contains a blowing agent which boils higher than the frothing agent.

18. The method of claim 17 wherein the frothing agent is dichlorodifluoromethane and the blowing agent is trichloromonofluoromethane.

19. The method of claim 4 wherein the deposited, partially expanded froth foam contains a blowing agent which boils higher than the frothing agent.

20. The method of claim 19 wherein the frothing agent is dichlorodifluoromethane and the blowing agent is trichloromonofluoromethane.

21. The method of claim 5 wherein the deposited, partially expanded froth foam contains a blowing agent which boils higher than the frothing agent.

22. The method of claim 21 wherein the frothing agent is dichlorodifluoromethane and the blowing agent is trichloromonofluoromethane.

23. The method of claim 8 wherein the deposited, partially expanded froth foam contains a blowing agent which boils higher than the frothing agent.

24. The method of claim 23 wherein the frothing agent is dichlorodifluoromethane and the blowing agent is trichloromonofluoromethane.

25. The method of claim 9 where the deposited, partially expanded froth foam contains a blowing agent which boils higher than the frothing agent.

26. The method of claim 25 wherein the frothing agent is dichlorodifluoromethane and the blowing agent is trichloromonofluoromethane.

27. The method of claim 10 wherein the deposited, partially expanded froth foam contains a blowing agent which boils higher than the frothing agent.

28. The method of claim 27 wherein the frothing agent is dichlorodifluoromethane and the blowing agent is trichloromonofluoromethane.

29. The insulation board of claim 27 wherein the deposited, partially expanded froth foam contains a blowing agent which boils higher than the frothing agent.

30. The insulation board of claim 29 wherein the frothing agent is dichlorodifluoromethane and the blowing agent is trichloromonofluoromethane.

31. The insulation board of claim 28 wherein the deposited, partially expanded froth foam contains a blowing agent which boils higher than the frothing agent.

32. The insulation board of claim 31 wherein the frothing agent is dichlorodifluoromethane and the blowing agent is trichloromonofluoromethane.

33. The insulation board of claim 29 wherein the deposited partially expanded froth foam contains a blowing agent which boils higher than the frothing agent.

34. The insulation board of claim 33 wherein the frothing agent is dichlorodifluoromethane and the blowing agent is trichloromonofluoromethane.

35. The insulation board of claim 30 wherein the deposited, partially expanded froth foam contains a blowing agent which boils higher than the frothing agent.

36. The insulation board of claim 35 wherein the frothing agent is dichlorodifluoromethane and the blowing agent is trichloromonofluoromethane.

37. The insulation board of claim 36 wherein the deposited, partially expanded froth foam contains a blowing agent which boils higher than the frothing agent.

38. The insulation board of claim 37 wherein the frothing agent is dichlorodifluoromethane and the blowing agent is trichlorofluoromethane.

39. The insulation board of claim 37 wherein the deposited, partially expanded froth foam contains a blowing agent which boils higher than the frothing agent.

40. The insulation board of claim 39 wherein the frothing agent is dichlorodifluoromethane and the blowing agent is trichloromonofluoromethane.

41. An insulation board comprising a core of rigid plastic foam having two major, substantially parallel surfaces and a facing material on at least one of the major surfaces of the core, the foam core being formed in accordance with the method of claim 1 by further expanding a partially expanded froth foam in contact with the facing material, and the cells of the resulting foam core containing the volatile frothing agent employed in the method.

42. The insulation board of claim 41 comprising a core of rigid plastic foam having two major, substantially parallel surfaces and at least one fibrous layer on each of the major surfaces, portions of the foam core at the two major surfaces penetrating interstices in and interlocking with the fibrous layers.

43. The insulation board of claim 42 wherein the fibrous layer comprises a mat of chopped, short glass fibers held together by a binder on each of the major surfaces.

44. The insulation board of claim 42 wherein the core is a member selected from the group consisting of polyurethane and polyisocyanurate foams.

45. The insulation board of claim 44 wherein the cells of the core contain a mixture of a more volatile frothing agent and a less volatile blowing agent, and the fibrous layer comprises a mat of chopped, short glass fibers held together by a binder on each of the major surfaces.

46. The insulation board of claim 45 wherein the frothing agent is dichlorodifluoromethane and the blowing agent is trichloromonofluoromethane.

47. The insulation board of claim 45 wherein the core is a polyisocyanurate foam comprising the reaction product of
(a) an organic polyisocyanate mixture of the formula:

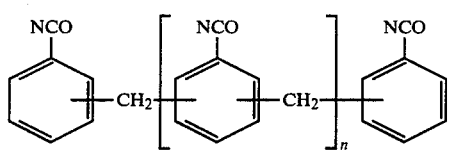

wherein n is an integer from 0 to 8 inclusive, and the mixture has:
 (1) a functionality of 2.1 to 3.8,
 (2) an equivalent weight between 120 and 180, and
 (3) a viscosity at 25° C. between 100 and 4,000 centipoises, and
(b) a minor amount of a polyol component selected from the group consisting of
 (1) an aromatic polyester polyol prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials,
 (2) an aromatic polyester polyol prepared by the transesterification, with a glycol of molecular weight from about 60 to about 400, of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids,
 (3) mixtures of the aromatic polyester polyols, and
 (4) mixtures of the aromatic polyester polyols with an alkylene oxide adduct of an aromatic amine of the formula

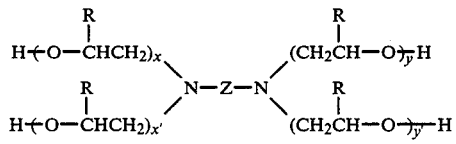

wherein Z is a divalent aromatic radical, x, x', y, and y' each independently have an average value from about 1 to about 5, and each R is independently selected from the group consisting of hydrogen, alkyl or aryl, provided that the adduct is capped with ethylene oxide units.

48. The insulation board of claim 47 wherein:
(a) the aromatic polyester polyol (1) is transesterified with diethylene glycol and is characterized by a viscosity in cps at 25° C. of about 700 to 2500, a free diethylene glycol content of from about 10 to 30 percent by weight of said mixture, a hydroxyl number within a range of from about 350 to 468, and an acid number of about 0.2 to 10,
(b) the aromatic polyester polyol (2) is transesterified with diethylene glycol and is characterized by a viscosity in cps at 25° C. of about 1,600 to about 2,800, a free diethylene glycol content of from about 20 to about 30 percent by weight of said mixture, a hydroxyl number within a range of from about 400 to about 490, and an acid number of about 0.2 to about 8, and
(c) the alkylene oxide adduct of an aromatic amine is an ethylene oxide adduct of toluene diamine isomers of the formula

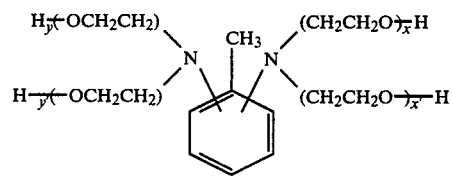

wherein the average number of oxyethylene units per polyoxyethylene chain is from 2 to 3.

49. The insulation board of claim 48 wherein the frothing agent is dichlorodifluoromethane and the blowing agent is trichloromonofluoromethane, and a trimerization catalyst comprising a mixture of 2,4,6-tris(dimethylaminomethyl)phenol and potassium-2-ethylhexoate is employed in the production of the polyisocyanurate foam.

50. The insulation board of claim 16 comprising a core of rigid plastic foam having two major, substantially parallel surfaces, at least one fibrous layer on each of the major surfaces, portions of the foam core at the two major surfaces penetrating interstices in and interlocking with the fibrous layers, and a facing sheet exterior to the fibrous layer on each of the major surfaces and adherent to the foam core.

51. The insulation board of claim 50 wherein the core is a member selected from the group consisting of polyurethane and polyisocyanurate foams.

52. The insulation board of claim 51 wherein the cells of the core contain a mixture of a more volatile frothing agent and a less volatile blowing agent, and the core has on each of the major surfaces a fibrous layer selected from the group consisting of a mat of chopped, short glass fibers held together by a binder and a mat of long, generally straight glass fibers held together by a binder, the long glass fibers of the mat being arranged in layers and the direction of the glass fibers in each layer being at an angle to the direction of the glass fibers in each next adjacent layer.

53. The insulation board of claim 52 wherein the frothing agent is dichlorodifluoromethane and the blowing agent is trichloromonofluoromethane.

54. The insulation board of claim 53 wherein the facing sheet on each of the major surfaces comprises aluminum foil.

* * * * *